United States Patent [19]
Florescu et al.

[11] Patent Number: 5,453,188
[45] Date of Patent: Sep. 26, 1995

[54] MAGNETIC APPARATUS FOR PREVENTING DEPOSIT FORMATION IN FLOWING FLUIDS

[76] Inventors: Viorel Florescu; Carmen-Michaela Florescu, both of 5550 N. Braeswood, #93, Houston, Tex. 77096

[21] Appl. No.: 230,080

[22] Filed: Apr. 20, 1994

[51] Int. Cl.[6] .................................................. C02F 1/48
[52] U.S. Cl. ................................... 210/222; 210/695
[58] Field of Search ......................... 210/222, 695; 422/186.01, 186.02

[56] References Cited

U.S. PATENT DOCUMENTS

| | | | |
|---|---|---|---|
| 3,228,878 | 11/1966 | Moody | 210/57 |
| 4,278,549 | 7/1981 | Abrams | 210/695 |
| 4,289,621 | 9/1981 | O'Meara | 210/222 |
| 4,299,700 | 11/1981 | Sanderson | 210/222 |
| 4,417,984 | 11/1983 | O'Meara | 210/695 |
| 4,422,934 | 12/1983 | Debney | 210/222 |
| 4,422,935 | 12/1983 | Mattingly | 210/223 |
| 4,455,229 | 6/1984 | Sanderson | 210/222 |
| 4,564,448 | 1/1986 | O'Meara | 210/222 |
| 5,052,491 | 10/1991 | Harms | 166/304 |
| 5,122,277 | 6/1992 | Jones | 210/695 |
| 5,178,757 | 1/1993 | Corney | 210/222 |

FOREIGN PATENT DOCUMENTS 10890058 4/1984 U.S.S.R. .

OTHER PUBLICATIONS

Speight and Moschopedis, "On the Molecular Nature of Petroleum Asphaltenes" 1981 Am. Chem. Soc. Proc.

*Primary Examiner*—Matthew O. Savage
*Attorney, Agent, or Firm*—Harrison & Egbert

[57] ABSTRACT

An apparatus and method for preventing and minimizing the formation of deposits of parrafin, asphaltene and scale on the inside of downhole oil string line and on the surface of flow transmission lines, by increasing the turbulence of various electrically-charged microscopic particles populating crude oil colloidal suspension, using effects of the Lorentz force acting upon such flowing fluid. A plurality of spaced-apart permanent magnet disc assemblies is disposed perpendicularly of a fluid flowing through conduits and the like, and is specially configured to provide a unique helicoidal trajectory of the various electrically-charged microscopic particles, subjecting these particles to a prolonged exposure to an intense magnetic flux. As the fluid experiences lamellar flow through the centrally located passageway, the charged particles exhibit turbulent, helicoidal flow through concentrated magnetic lines of force.

16 Claims, 5 Drawing Sheets

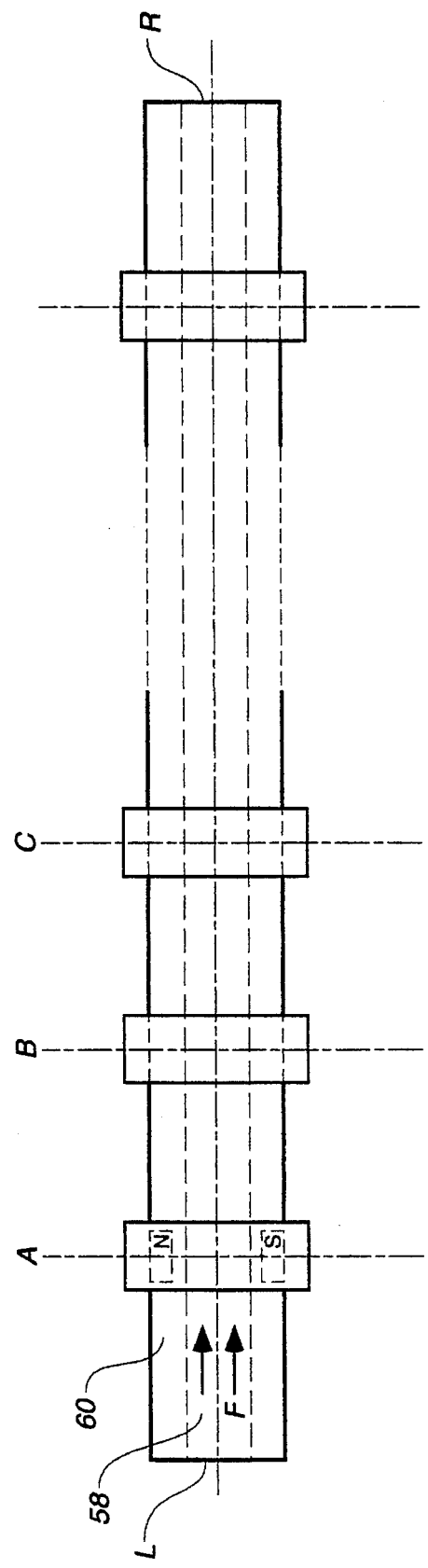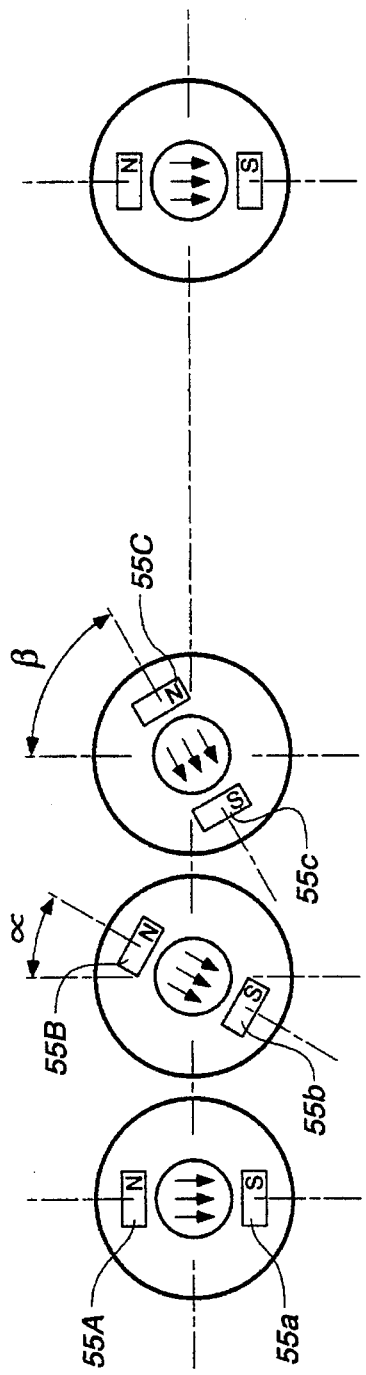
FIG. 4A
FIG. 4B

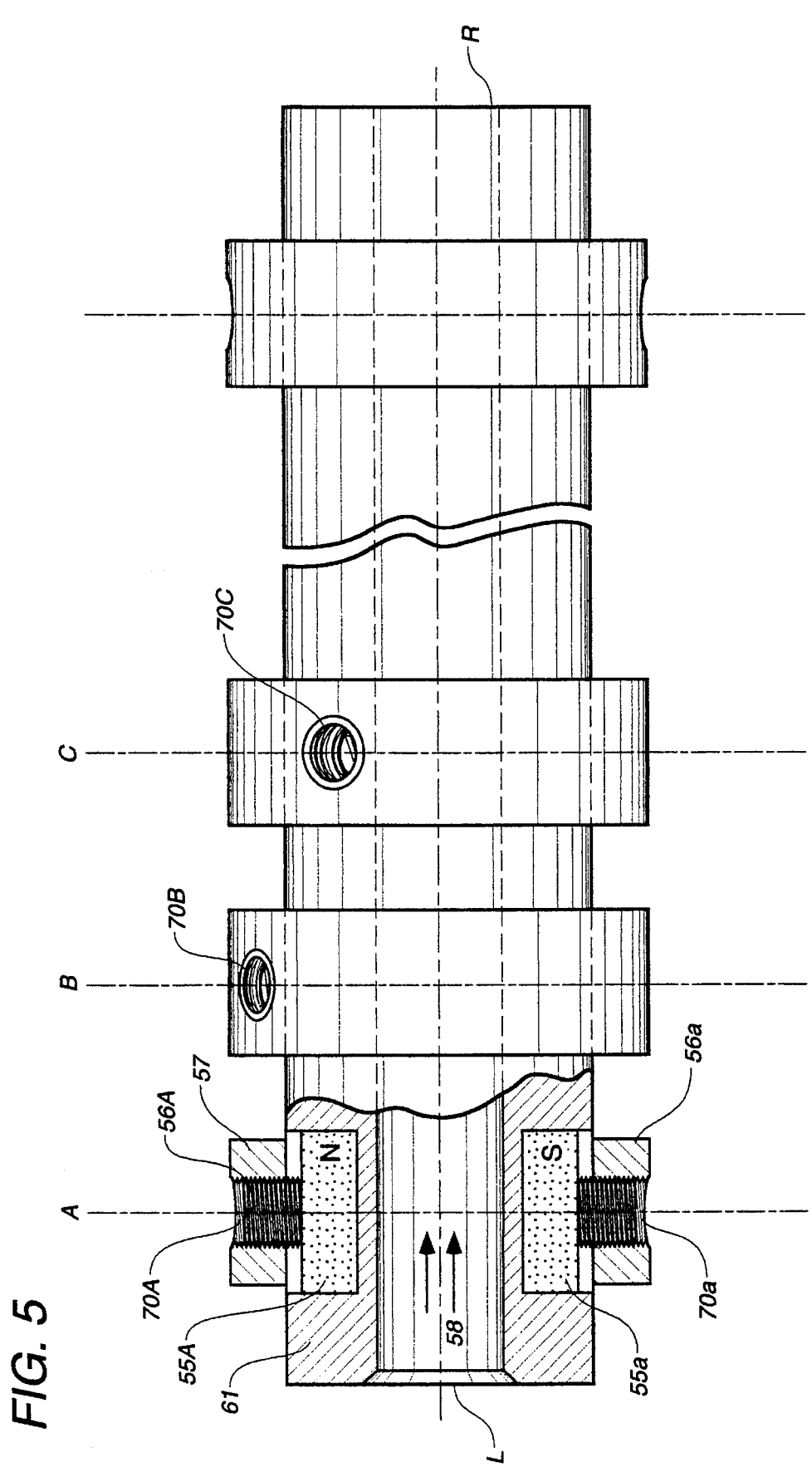

MAGNETIC APPARATUS FOR PREVENTING DEPOSIT FORMATION IN FLOWING FLUIDS

BACKGROUND OF THE INVENTION

This invention relates to the formation of deposits inhibiting fluid flow in conduits and the like, and more particularly relates to methods and means for preventing the formation of deposits and the like in downhole pipe and other conduit environments, using magnetic fields generated by in situ permanent magnets.

It is well known in the prior art that paraffin, asphaltene and salts dissolved in water are important constituents of most crude oils. It is also well known that these constituents tend to form deposits in pipelines located oil field and refining operations, which inhibit fluid flow and thereby adversely affect production throughout the oil industry.

As will be appreciated by those skilled in the art, the nature and content of such adverse deposits vary as a function of various parameters including crude oil rheological composition, formation temperature, well depth, pressure drop, and even method of production.

Paraffins comprise straight-chains or branched alkanes of relative high molecule, weight. Asphaltenes comprise dark brown to black components present in crude oil with a relatively high molecular weight. J. G. Speight and S. E. Moschopedis, in their paper "On the Molecular Nature of Petroleum Asphaltenes," published in Am. Chem. Soc. Proc., 1981, report that there are indications that asphaltenes consist of condensed aromatic nuclei that carry alkyl and alicyclic systems with heterocyclic elements, i.e., nitrogen, oxygen, sulfur, scattered throughout. Studies of the elemental compositions of asphaltene fractions precipitated by different solvents indicate that the amounts of carbon and hydrogen present in deposits usually vary over only a narrow range, e.g., 82+3% carbon; 8.1+0.7% hydrogen. J. G. Speight, "The Structure of Petroleum Asphaltenes," Inform. Series, Alberta Research Council, No. 81, 1978 and 178th National Meeting, Am. Chem. Soc., Washington, D.C., Sept. 1979.

Nevertheless, earlier research found that variations occur in the proportion of the heterocyclic elements found in asphaltene deposits, particularly oxygen and sulfur. Nitrogen content, on the other hand, seems to remain relatively constant. P. A. Witherspoon and Z. A. Minir theorized, in the paper entitled "Size and Shape of Asphaltic Particles in Petroleum" delivered at the AIME Fall Meeting, Los Angeles, Calif., Oct. 1958, that asphaltenes are located in the nucleus of an immense collection of molecules called "micelies." Surrounding this nucleus are lighter and less aromatic constituents that resemble alkanes found in paraffins called "resins." Thus, it believed that based upon observations of this structure that asphaltene particles form and behave like colloids.

It is well known in the prior art that colloidal particles remain suspended so long as equilibrium between the particulate phase and the solvent phase is maintained. If, however, equilibrium conditions change even slightly, paraffin may precipitate from the crude oil solvent phase. It was reported by C. E. Reisle, in his paper, "Paraffin and Congealing Oil Problems," Bull. USBM, p. 348, 1932, that the most significant cause of this precipitation is decrease in temperature. It will be appreciated by those skilled in the art that paraffin molecules, even in crystalline form, tend to remain colloidally dispersed in crude oil, unless the paraffin molecules are caused to congeal by nucleating materials. Such nucleating materials act as catalysts to accumulate paraffin molecules and crystals into agglomerations much larger in dimension than paraffin single crystal formations. These agglomerations ultimately can no longer remain colloidally dispersed in crude oil and precipitate out, thereby forming deposits throughout the well's producing system and concomitant equipment, both downhole and at the surface. The nucleating materials in the crude oil colloidal suspension include asphaltenes, corrosion products, salts dissolved in water and formation fines. As is known in the art, all of these nucleating materials carry an electrical charge.

In the case of asphaltene, the transfer of peptizing agents, i.e., resins, from the asphaltene phase to the crude oil phase and vice-versa is responsible for the aggregation of asphaltene micelies and their flocculation into larger entities which causes precipitation out of colloidal suspension. Since the highly polar centers of the asphaltene micelies have a natural tendency to attract each other and thereby aggregate and flocculate, and, of course, as a result, no longer remain suspended throughout the crude oil phase.

Similarly, it is also well known in the prior art that scale deposits frequently form when natural water flows through pipes and other thermodynmnic vessels. Such natural water contains various dissolved or suspended minerals which can be caused to precipitate out and form scales and the like. The scales usually consist of solid deposits comprising precipitation salts, like barium sulfate, calcium sulfate, magnesium sulfate, magnesium carbonate, calcium carbonate, etc.

It is common knowledge that paraffin, asphaltene and scale deposits typically vary from one reservoir to another. Indeed, sometimes differences in deposits have even been observed in wells in the same reservoir. Them have been many attempts in the prior art to provide means and methods for minimizing the adverse affects of deposit formation on fluid flow in downhole and surface oil operations and water flow systems. Such attempts to improve this art teach a variety of mechanical, chemical, thermal and magnetical systems for removing paraffin, asphaltene and scales, or for preventing this deposit-fonnation process.

For example, in U.S. Pat. No. 5,178,757, Comey teaches a magnetic tool for conditioning fluids which includes a hollow core providing at least one passage through which the fluid to be treated flows. An array of magnets extends longitudinally along the core with the poles of the magnets arranged to provide a magnetic field perpendicular to the flow path to enhance the magnetic conditioning effect of the tool. But, unfortunately, there is only a limited exposure of the charged particles in the colloidal suspension to the magnetic field: the short straight linear path taken by the charged particles affords minimal exposure to the magnetic lines of force.

As another example, O'Meara, in U.S. Pat. No. 4,564,448, discloses a magnetic fluid treatment tool comprising a hollow, cylindrical housing containing a central magnetic assembly and one or more concentric ring magnetic assemblies. Another passageway between the core magnet assembly and the ring magnet provide fluid flow paths through the O'Meara tool. Since O'Meara teaches magnets directly in contact with liquid flowing through a conduit, its applicability is restricted to aqueous liquids and the like. Viscous and heterogeneous fluids like crude oil would foul the in situ magnets and interfere with the operation of this tool. Furthermore, the magnetic field is perpendicular to the flowing aqueous fluid only in four locations, i.e., at the four concentric ring magnets. Accordingly, the magnetic flux is closing not through the flowing fluid, but through the other elongated magnets.

Another contribution to the art was made by Debney et al. wherein in U.S. Pat. No. 4,422,934 is disclosed a magnetic device for the treatment of calcareous fluids. This device has an elongate housing with an inlet and an outlet for the flow of liquid therethrough. The magnets are held in position by a plurality of transverse holding elements which are positioned so that the magnets are angularly disposed in a helical arrangement. The magnets are directly immersed in the fluid flowing through the device. Unfortunately, the magnetic flux is almost parallel to the flowing fluid. Thus, the affect of the magnetic field on the charged particles scattered throughout the fluid will be weak.

A recent improvement in the prior art is taught by Harms et al. in U.S. Pat. No. 5,042,491 with regard to a method and tool for controlling paraffin deposits in oil flow lines and downhole strings. The Harms approach is to interrupt the flow of electrostatic forces by functioning as a static drain, removing the affects of frictional static forces built up during oil flowing in pipelines. The presence of a nonmagnetic and nonconductive liner provides a magnetic shield which theoretically interrupts this electrostatic flow. Again, the Harms invention suffers from the inherent deficiency of providing only a minimal exposure of the charged particles to the influence of the magnetic field.

Similarly, other prior art magnetic tools have consisted of little more than means for suspending magnets around a piping system through which flowing fluid passes. Examples of this form of magnetic fluid conditioning tools are generally described in U.S. Pat. Nos. 4,299,700; 4,417,984; 4,455,229; 4,422,935; 4,289,621; 4,278,549; and 3,228,878; and in Japanese Patent No. 189,991; United Kingdom Patent Nos. 1,311,794 and 2,023,116; Soviet Patent No. 590,438; French Patent No. 2,236,788; and German Patent No. 1,642,524.

While, as hereinbefore exemplified, practitioners in the art have attempted to improve the means for removing deposits from pipelines and the like, there has been less effort expended to prevent the formation of such deposition. But, with the demands for increased oil production from limited natural resources, even relatively small increases in the exposure of charged asphaltene colloidal particles in crude oil to the affects of magnetic fields have been found to significantly improve the stability of colloidal suspensions, thereby minimizing and even preventing depositions on pipelines and the like.

Similarly, minimizing or preventing scaling in water systems and even minimizing or preventing deposits in the vascular systems in humans may be achieved if the colloidal nature of flowing fluids is understood and the suspended particles sufficiently stabilized.

Accordingly, these limitations and disadvantages of the prior art are overcome with the present invention, and improved means and techniques are provided which are useful for sustaining the stability of colloidal suspensions in crude oil and the like, and for minimizing or even preventing deposits in pipelines and the like.

SUMMARY OF THE INVENTION

The present invention provides a method and a device for controlling and eliminating the deposition and build up of parrafin, asphaltene and scale on the inside of downhole oil string line and on the surface of flow transmission lines. The methodology taught by the present invention seeks to increase the turbulence of various electrically-charged microscopic particles populating crude oil colloidal suspension, using effects of the Lorentz force acting upon flowing fluid.

Apparatus constructed according to the present invention preferably incorporate a plurality of spaced-apart neodimium-iron-boron (NdFeB) permanent magnet disc assemblies with their major faces disposed against fluid flowing through conduits and the like. This plurality of magnetic disc assemblies is specially configured to provide a unique helicoidal trajectory of the various electrically-charged microscopic particles, subjecting these particles to a prolonged exposure to an intense magnetic flux. As will be hereinafter described in detail, while the fluid experiences lamellar flow through the passageway centrally located in the preferred embodiment of the present invention, the charged particles exhibit turbulent, helicoidal flow through the magnetic lines of force.

In accordance with the present invention, the magnetic flux of each of the permanent magnet pairs is closed by a special magnetic shield or shell, with the only gap in the region of the flowing tube. The magnetic flux in the gap region is perpendicular to the flowing fluid.

Accordingly, in accordance with the present invention, methods and means are provided to prevent deposits from forming on the interior walls of conduits and the like, by using the Lorentz force to stabilize underlying colloidal suspension of various charged microscopic particles. As will be appreciated by those skilled in the art, in accordance with the present invention, methods and means heretofore unknown in the prior art are provided whereby deposition upon interior conduit walls may be efficiently prevented or at least significantly minimized.

It is an object of the present invention to provide a method for increasing the turbulence of various charged microscopic particles which exist in a colloidal state within a diversity of fluids.

It is also an object of the present invention to provide a method and apparatus for establishing the optimum magnitude of magnetic flux and relative arrangement of a plurality of permanent magnet assemblies for a fluid with particular rheological properties, in order to maximize the effect of the Lorentz force upon charged particles contained in colloidal state within the fluid.

It is a further object of the present invention to provide an apparatus which enables optimum application of the Lorentz force by combining the effects of an intense, lossless magnetic flux and a fluid flowing through a narrow passageway perpendicularly of the direction of the lines of force, for preventing or minimizing deposition on the interior of conduit walls.

It is another object of the present invention to provide an apparatus which enables and method for preventing or minimizing deposition on the interior of conduit walls without any threat of invasion of the environment by chemicals, by-products, or any other foreign material.

It is a feature and advantage of the present invention that it not only provides efficient application of the Lorentz force to stabilize colloidal suspensions found in crude oil and other fluids, in a manner heretofore unknown in the prior art, but also affords an inherently self-cleaning apparatus because of the higher velocity of the flowing fluid.

These and other objects and features of the present invention will become apparent from the following detailed description, wherein reference is made to the figures in the accompanying drawings.

IN THE DRAWINGS

FIG. 4A depicts a schematic representation of a frontal longtudinal isolated view of the apparatus depicted in FIG. 1, showing a sequence of a plurality of magnet assemblies disposed longitudinally of flowing fluid.

FIG. 4B depicts a schematic representation of successive traverse views of the apparatus depicted in FIG. 4A, showing a sequence of angles of rotation of the plurality of magnet assemblies and the concomitant sequence of magnetic lines of force.

FIG. 5 depicts a partial cross-sectional view of the apparatus depicted in FIG. 1, showing a permanent magnet core assembly configured with permanent magnets surrounded by conductive magnetic flux rings.

DETAILED DESCRIPTION

Figure 1:
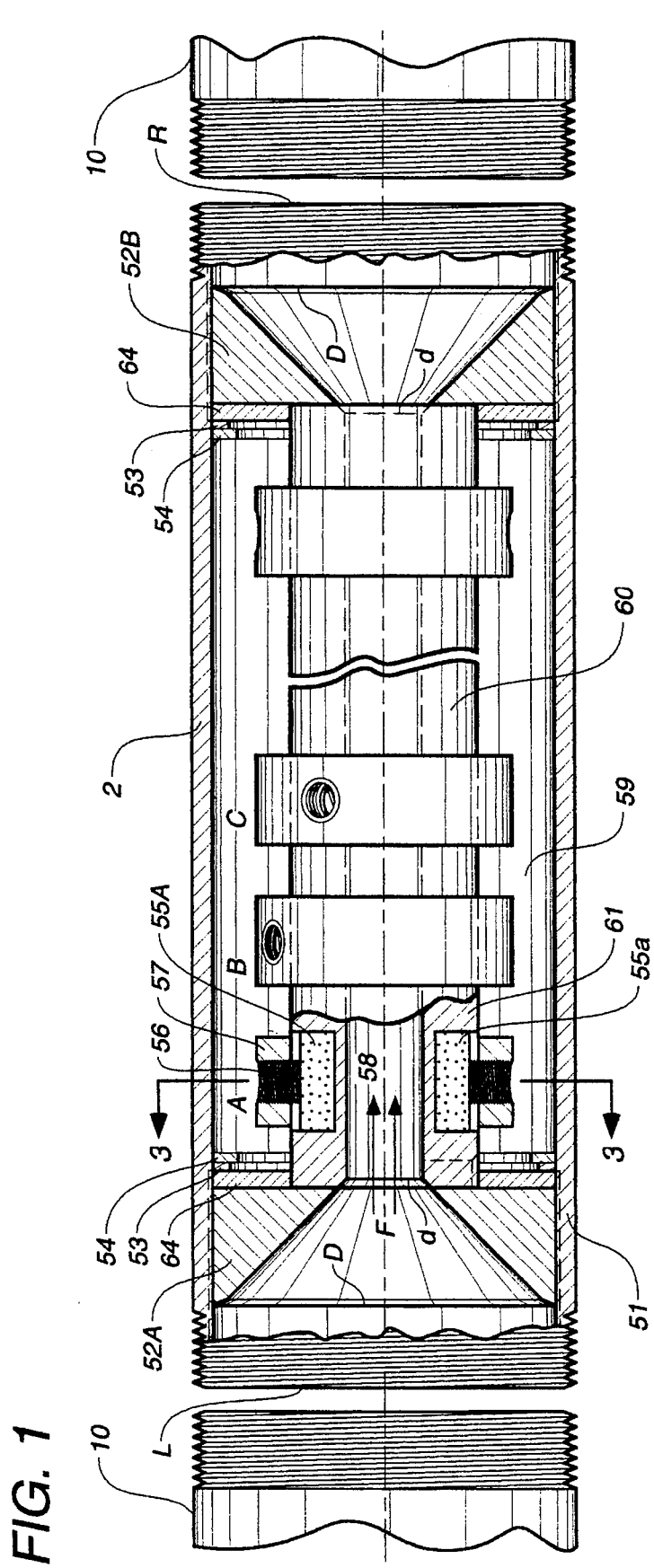
FIG. 1 depicts a longitudinal frontal view in partial cross-section of the present invention, parallel to the direction of fluid flow.

FIG. 1 depicts a longitudinal frontal view in partial cross section of a preferred embodiment of a magnetic apparatus 2 interconnected with conduit 10, for preventing deposit formation in flowing fluid F, constructed in accordance with the teachings of the present invention. More particularly, there is shown preferably elongated hollow housing 51 encasing plurality of spaced-apart magnet assemblies A, B, C, . . . as will be hereinafter described in detail.

As will become evident to those skilled in the art, the novel approach and method taught by the present invention comprises the steps of: (1) application of a high intensity external magnetic field to nucleating components which tend to cause paraffin deposition; (2) perturbation of the normal asphaltene flocculation process by the action of a magnetic force field; and (3) creation in the bulk of the salt water solution of a large number of microscopic nucleating sites. As will also become evident to those skilled in the art, these three steps are controlled by an external magnetic field. Since a crude oil colloidal suspension contains a plethora of microscopic particles, e.g., nucleating materials, free radicals, ions, etc., which carry negative or positive electrical charges, the magnetic force field acting upon these particles in the flowing fluid causes a microscopic turbulence according to the Lorentz force. The extent and degree of the resultant turbulence will be directly proportional with the magnitude of the Lorentz force and with the exposure time of the charged particles to the external magnetic field. In particular, as is known in the art, a slightly conducting fluid flowing in a tube under the influence of external electric and magnetic fields is a subject to a Lorentz force:

$$\vec{f} = Q(\vec{E} + \vec{v} \times \vec{B}) \quad (1)$$

where:

Q is electrical charge of particles on colloidal state in the fluid; $\vec{E}$ is the external electric field; $\vec{v}$ is the velocity of the charged particles in the moving fluid; and $\vec{B}$ is the external magnetic field.

The absolute value of the Lorentz force, when the external electric field is zero, is:

$$|\vec{f}| = Q|\vec{v}||\vec{B}|\sin(\vec{v},\vec{B}) \quad (2)$$

Ergo, to obtain maximum effect upon the diversity of charged particles populating colloidal suspensions, it is advantageous to increase the absolute value of the Lorentz force. From the relationship represented in equation 2 herein, the goal of subjecting charged particles to maximal lines of magnetic force may be achieved by (a) increasing the value of vector v, the velocity of the particles in the colloidal suspension; (b) increasing the value vector B, the strength of the external magnetic field; and/or (c) maximizing the value of the sinusoidal function of vectors v and B. The value of the electrical charge of particles (Q), of course, depends from the inherent rheological properties of the microscopic particles contained in the fluid components, which is specific for each particular crude oil. Increasing the velocity (implicating vector v) of flowing fluid may be achieved by deceasing conduit cross-section to achieve higher Venturi effect and the like. Increasing the value of external magnetic field (implicating vector B) may, of course, be accomplished by using powerful magnets affording a high value of the remanent induction (Br). As should be evident to those skilled in the art, the maximum value of the sinusoidal function of vectors v and B may be achieved when the respective directions of vector v and vector B are perpendicular to each other. Thus, for controlling the impact of an external magnetic force field, the velocity of the flowing fluid is generally limited by the diameter of the conduit typically used in the environment, either in pipelines downhole or at the earth's surface, in water lines and in human vascular systems. Significant control may be effectively achieved, however, by properly selecting magnet strength and the relative directions of the flowing fluid and magnetic lines of force.

In addition to this analysis, however, there is another factor which has been generally ignored by the prior art: the time of exposure of the charged particles to the stabilizing magnetic field. To cause an increase in the duration of exposure time of charged particles to external magnetic field under environments with typically fixed physical constraints, it is necessary to increase the trajectory of the charged particles flowing in a conduit and the like, in the region where the external magnetic field is concentrated.

Referring now to FIGS. 1–7 there is depicted a preferred embodiment of the present invention constructed according to these concepts of prolonged exposure to intense Lorentz magnetic force. Referring now to FIG. 1, there is depicted plurality of permanent magnet assemblies A, B, C, . . . . which are disposed in a spaced-apart and parallel relationship within hollow cylindrical housing 51 as will be hereinafter described in detail. As will become evident to those skilled in the art, housing 51 generally comprises a tubular cross-section which, of course, may be cylindrical, elliptical or even square in cross-section. The preferred embodiment as described in detail herein, is configured to accommodate conduits which typically have cylindrical shape.

Figure 2:
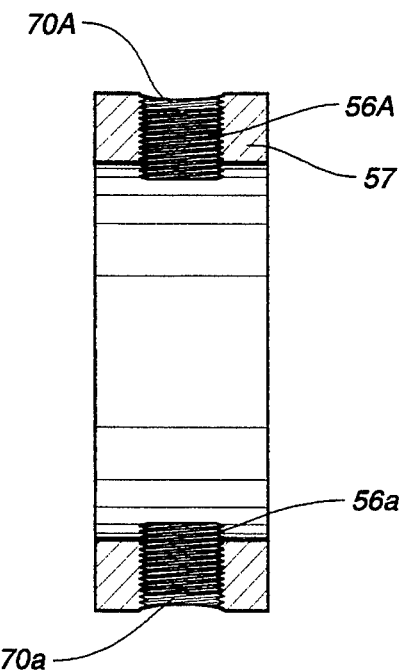
FIG. 2 depicts a partial cut-away isolated frontal view of the magnetic shell portion of the apparatus depicted in FIG. 1.

Still referring to FIG. 1, each pair of permanent magnets 55A-a, B-b, etc. of this plurality of magnet assemblies is shown relative to sleeve 61 and shell 57. Sleeve 61 is located annularly of housing 51 and fluid passageway 58. Shell 57 is disposed transversly and circumferentially of sleeve 61. Thus, each pair of permanent magnets is affixed transversely inside of sleeve 61 and each corresponding shell is affixed transversely outside of sleeve 61. In particular, permanent magnet pairs 55A-a, B-b, etc. are respectively fastened to cylindrical shell 57 which is, in turn, fastened to sleeve 61, with corresponding screws 56A-a, B-b, etc.. As will become evident to those skilled in the art, shell 57 and screws 56A-a preferably are constructed from soft magnetic materials. FIG. 2 shows a partial cut-away isolated frontal view of the shell portion of the apparatus depicted in FIG. 1 which more particularly depicts the relationship between magnetic cylindrical shell 57 and magnetic screws 56A-a and non-magnetic fluid passageway 58.

Again referring to FIG. 1, and more particularly focusing upon permanent magnetic assembly A, there is shown pair of permanent magnets 55A-a fastened to shell 57 with screws 56A-a, respectively. Fluid flowing through conduit 10 enters the preferred embodiment at inlet end L and exits therefrom at outlet end R. The diameter of the conduit holding flowing fluid is reduced from D to d as the fluid flows through a tapered cylindrical region manifest by slant member 52A at inlet end L and then enters contiguous passageway 58, also configured with diameter d. As should be apparent to those skilled in the art, as the flowing fluid eventually exits from passageway 58 through contiguous slant member 52B at outlet end R, the diameter of the conduit holding the flowing fluid is increased from d to D as the fluid re-enters conduit 10. Thus, as fluid enters the present invention at inlet end L, slant member 52A preferably provide a conical section in which there is a smooth transition from larger diameter D to smaller diameter d, with concomitant proportional increase in velocity of the flowing fluid. As should be clear to those skilled in the art, the conical cross-section enables this velocity transition to be achieved without causing turbulence. Of course, other velocity-increasing means for providing a contiguous region enabling gradual transition from a lower to higher velocity is within the teachings of the present invention. Similarly, other velocity-reducing means for providing a contiguous region enabling gradual transition from a higher to lower velocity is also within the teachings of the present invention. As will become clear to those skilled in the art, it is an advantage and feature of the present invention to simultaneously sustain a streamline, lameliar fluid flow and a turbulent, helicoidal charged-particle flow.

Still referring to FIG. 1, there is also shown elongated annular chamber 59, disposed axially of said housing 51, which is either filled with air or a fluid as will hereinafter be described. When the present invention is applied to a downhole pipeline perhaps at 500 to 600 feet below the earth's surface, there are substantial external pressures exerted upon the walls of the pipe and upon housing 51 of the preferred embodiment. To avoid housing 51 from cracking or imploding from such substantial pressures, chamber 59 is preferably filled with a liquid like transformer oil, to provide sufficient resistance to these pressure affects. According to the present invention, chamber 59 is sealably closed with rubber gaskets 53 which abut retaining shoulders 54 which in turn, abut flanges 64. When the present invention is applied to a pipeline on the surface or to other environments in which external pressure is minimal, chamber 59 is preferably occupied by air.

Referring specifically to FIGS. 1 and 4, there is shown that plurality of parallel permanent magnet assemblies A, B, C, . . . . which are located axially of elongated housing 51 and placed in an angulated configuration manifesting a spiral shape from left to right. That is, plurality of magnet assemblies A, B, C, . . . . are mounted on core assembly 60 preferably by suitable attachment means like threaded coupling members, to attach or flange preferred embodiment 2 to conduit or pipeline 10 at the surface or downhole. Slanted member 52A is mounted on flange 64 which is, in turn, disposed on top of rubber gasket 53 and shoulder member 54. Shoulder member 54 is preferably welded with body member 51 and fixedly retains core assembly 60 within housing 51. In accordance with the preferred embodiment of the present invention, plurality of permanent magnets A, B, C, . . . may be flat disks having suitable length, width and thickness.

Figure 6:
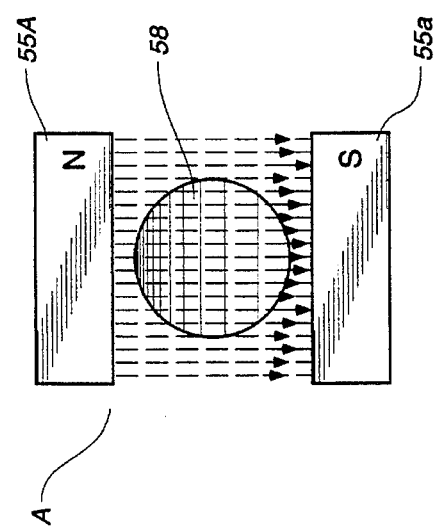
FIG. 6 depicts a schematic shape of the lines of force engendered by the preferred arrangement of magnets embodying the present invention, relative to the flowing fluid for a permanent magnet assembly having a pair of permanent magnets.

As shown in FIG. 6, each pair of magnets 55A-a, B-b, etc. of plurality of magnet assemblies A, B, C, etc. are positioned so that their major, cylindrical faces extend sufficiently parallel to passageway 58. In accordance with the present invention, the lines of force are clearly shown as being perpendicular to the fluid flow through passageway 58. As will be appreciated by those skilled in the art, and depicted in FIGS. 3–5, each pair of magnets 55A-a, B-b, . . . of plurality of magnet assemblies A, B, C, . . . is disposed with respective opposed magnetic poles in order to produce a magnetic field directly across passage 58. Shell or ring 57 is installed around each pair of magnets 55 to enclose the magnetic flux.

Figure 3:
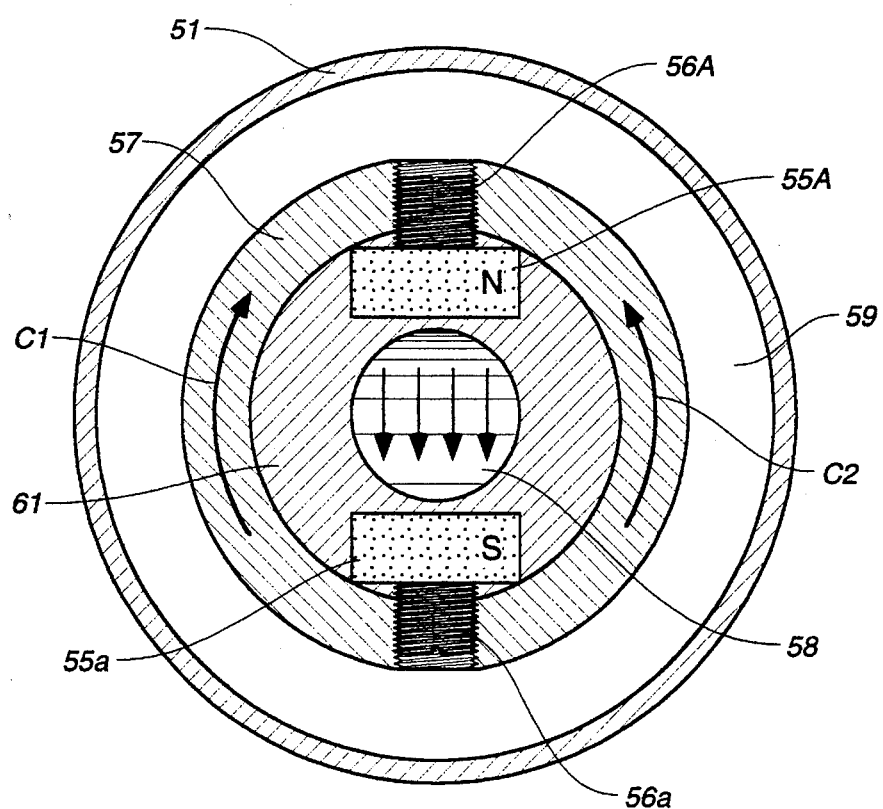
FIG. 3 depicts a transverse cross-sectional view of the apparatus depicted in FIG. 1, along line 3—3.

As clearly depicted in FIG. 3, it an advantage of the present invention that the lines of magnetic force are concentrated linearly from the North to South pole of each magnetic pair. These concentrated lines of force are directed perpendicularly of the fluid flowing through passageway 58. Pair of screws 56 A-a secure permanent magnet pair 55A-a to cylindrical shell 57. Screws 56A-a and shell 57 are constructed from soft magnetic material having high permeability. Representative soft magnetic materials which may be used in the present invention include iron, low-carbon steels, iron-alluminum alloys. Thus, the combination of shell 57 and screws 56A-a provide containment means to contain the magnetic lines of force which a restricted closed loop defined by circular arrows C1 and C2. That is, line of closing flux is schematically shown with semicircular arrows C1 and C2. There is virtually no magnetic flux loss due to lines of magnetic force conventionally emanating radially from magnets 55A-a; all of the lines of force are concentrated within shell 57. Accordingly, either the lines of force are providing an intense magnetic field linearly between each magnet pair or are being cycled along arrowed lines C1 and C2. Hence the closed magnetic flux cycle.

Each permanent magnet pair 55A-a, B-b, C-c, . . . . of plurality of magnet assemblies A, B, C, . . . . is preferably constructed of neodymium-iron-boron or other known Rare-Earth magnetic materials which are known to create strong magnetic poles in their major faces. Other types of permanent magnets commonly used by those skilled in the art include ferrites, aluminum-nickel-cobalt alloys and sintered neodymium-iron-boron. As will be understood and appreciated by those skilled in the art, based upon a consideration of these magnets inherent strength (measured by the product of $(BH)_{max}$ and temperature stability (Curie temperature), NdFeB has been found to provide maximal magnetic field strength and effectiveness acting upon flowing fluids as hereinbefore described.

The flowing fluid and the plurality of magnets, according to the present invention, do not have any physical contact. Core assembly 60 is defined by tubular outer sleeve 61 which is coaxial with passageway 58. Sleeve 61 is preferably constructed of non-magnetic material, e.g., 321 stainless steel or aluminum, with an inner wall which preferably has a smooth surface to promote lameliar fluid flow.

Referring now to FIGS. 4A–B and 5, there is seen a frontal view of a schematic arrangement of plurality of magnet assemblies A, B, C, . . . observed longitudinally of conduit 10. FIG. 4A depicts a schematic representation of a frontal longitudinal isolated view of the apparatus depicted in FIG. 1, showing a sequence of a plurality of magnet assemblies disposed longitudinally of flowing fluid. FIG. 4B depicts a schematic representation of successive traverse views of the apparatus depicted in FIG. 4A, showing a sequence of angles of rotation of the plurality of magnet assemblies and the concomitant sequence of magnetic lines of force. FIG. 5 depicts a partial cross-sectional view of the apparatus depicted in FIG. 1, showing solid magnetic cylinder configured with permanent magnets surrounded by conductive magnetic flux rings. As particularly shown in FIG. 4B, each successive pair of magnets is rotated through a particular angle to achieve an advantageously prolonged trajectory of the charged particles that populate the flowing fluid. Thus, magnet pair 55B-$b$ is rotated through $\alpha$ degrees relative to magnet pair 55A-$a$. Similarly, magnet pair 55C-$c$ is rotated through $\beta$ degrees relative to magnet pair 55A-$a$. It should be apparent that this rotation of each permanent magnet pair is relative to North pole positioned atop each permanent magnet assembly.

Under the teachings of the present invention, the prerequisite angle through which each successive magnet pair is rotated differs according to the observed rheological properties of the flowing fluid. As hereinbefore described, the goal is to provide a helicoidal path for the charged particles to maximize their residence time in the intense magnetic field afforded by the present invention.

Accordingly, an embodiment of the present invention would be configured with magnet pair B rotated with an $\alpha°$ relative to magnet pair A. According to the teachings of the present invention, magnet pair C would then preferably be rotated with $\beta°$ to obtain an advantageous helicoidal trajectory to, in turn, effectuate maximal turbulence of charged particles within the flowing fluid. As an example, magnet pair C could be rotated by $\beta°=2\alpha°$ relative to magnet pair A with magnet pair B rotated by $\alpha°$ relative to magnet pair A. Thus, as lameliar fluid flow occurs through passageway 58, the charged particles contained in the flowing fluid follow a preferably helicoidal trajectory dictated by the herinbefore described novel arrangement of a sequence of magnet pairs, which function in the rheological environment inherent in the fluid. By observing the successive threaded receptacles 70A, B, C in FIG. 5 the relative position of each magnet pair may be readily observed. As should be evident to those skilled in the art, screws 56A, B, C are received by corresponding threaded receptacles 70A, B, C, respectively. Also depicted is threaded receptacle 70$a$ which, similarly, receives screw 56$a$.

It should be clearly understood that longer or shorter helicoidal trajectories may be fashioned by suitably arranging the sequence of angulated permanent magnet assemblies, i.e., A, B, C, . . . , relative to the inherent rheological properties of the flowing fluid. In addition, again depending upon the rheological nature of the flowing fluid, multiple helicoidal trajectories may be fashioned by suitably arranging the sequence of angulated permanent magnet assemblies. Ergo, under the present invention, the degree of turbulence experienced by the charged particles contained in crude oil and the like may be efficiently controlled by external magnetic field.

It has been found that when the preferred embodiment is applied in pipelines either downhole or at the surface, using NdFeB permanent magnets with a remanent induction, $B_r$, as hereinbefore described in detail, the value of the magnetic field obtained linearly between each respective pair of these magnets is about 4,000 Gauss. Under these conditions, as taught by the present invention, paraffin, asphaltene and scale deposition in crude oil is reduced with an efficiency and reliability heretofore unknown in the art. Indeed, it has been found that the means and methods taught by the present invention may even effectively prevent deposition formation in pipelines, under predetermined flowing fluid rheological properties and under suitable concomitant conditions of magnetic flux and offset arrangement of a plurality of permanent magnet assemblies, producing sufficient particulate turbulence caused by forced helicoidal trajectories thereof.

Figure 7:
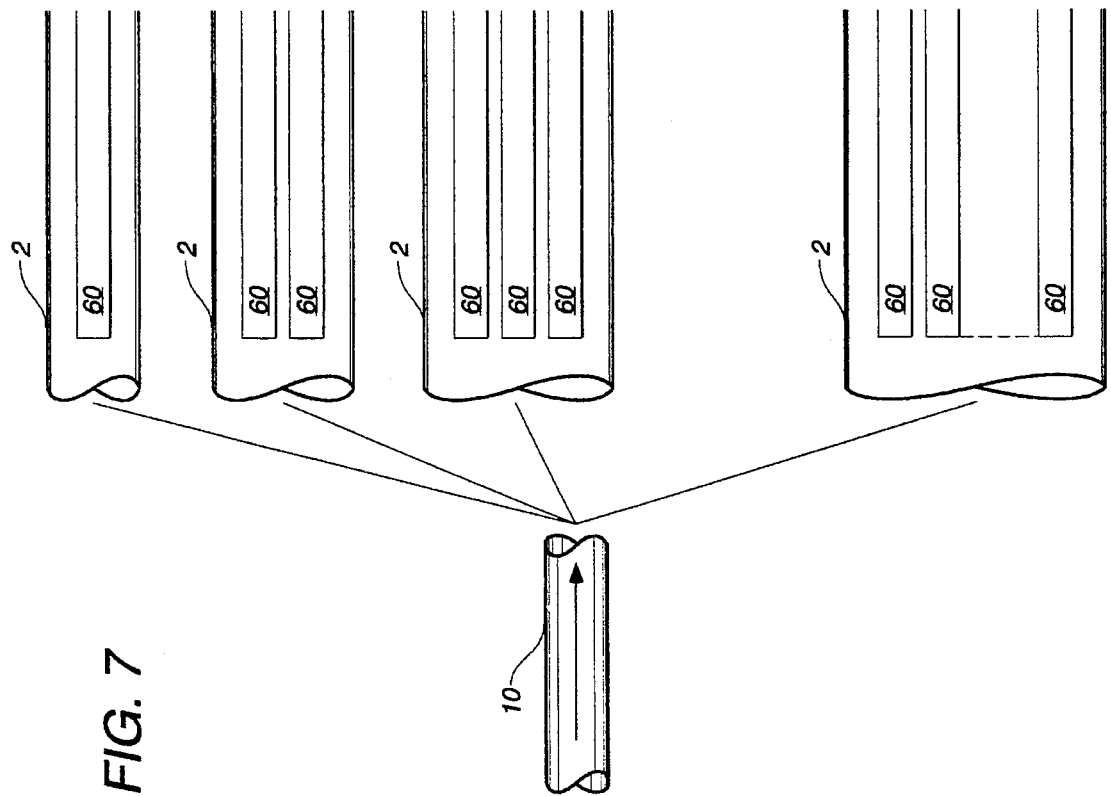
FIG. 7 depicts a simplified schematic representation of the present invention embodying from one to many permanent magnet core assemblies, depending upon conduit diameter.

As shown in FIG. 7, the present invention accommodates conduits of various diameters. In the alternative arrangements of the present invention depicted, passageway 58 may actually comprise a plurality of identical permanent magnet core assemblies 60. In particular, shown top-down in FIG. 7 is fluid flow passage 58 consisting of one core assembly, two core assemblies, three core assemblies, and then a plurality thereof. Ergo, for large diameter conduit, the flow passageway disclosed in the present invention may be configured with more than one flow path and even different inner diameters and shapes. In this manner, pressure equalization across the conduit occurs, thereby distributing the flowing fluid among each of the several flow paths.

In accordance with the present invention, when the flowing crude oil engages position in the pipeline where the magnets are situated, the Lorentz force effectively acts upon the various charged particles, thereby changing their linear trajectory into a helicoidal trajectory. As has hereinbefore been described in detail, this action prolongs the exposure time of the charged particles to the external magnetic field. Thus, the present invention affords an efficiency for stabilizing colloidally dispersed particles which has been heretofore unknown in the prior art.

As should be evident to those skilled in the art, the present invention may be applied to a diversity of applications and environments which are susceptible to deposition by particles and the like colloidally suspended, by appropriately modifying the scale and materials of construction and adapting the attachment means to conduits and the like. Of course, an important feature and advantage of all embodiments of the present invention is that all applications thereof are free of any invasions into the environment: there are no discharges or effluent into the environment. For example, the present invention may be easily applied to virtually any system dependent upon pipelines and the like to circulate fluids.

As another example, the present invention may even be applied to storage tanks, tank trucks and railway tank cars. As should also be clear to those skilled in the art, the present invention may also be advantageously used to avoid deposition in oil tankers and the like, and to accordingly avoid clogging of pipelines through which oil enters and exits vessels. Still another application of the present invention is to avoid health-threatening deposits formed in human vascular systems. As will be appreciated by those skilled in the art, however, while fluids flowing within the human body do not typically contain charged particles as contemplated by the present invention, there are nonetheless magnetic particles based upon iron which may be deflected by suitable magnetic lines of force to yield the helicoidal pattern or trajectory taught herein. As will also be readily understood by those conversant in the art, such medical techniques as nuclear magnetic resonance are premised upon magnetic moments being present in the human body. Thus, the teachings of the present invention may be applied to prevent deposition in vascular systems in the human body.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. In a fluid, with particular rheological properties, containing colloidally suspended charged particles and flowing through a conduit having an upstream portion and a downstream portion, an apparatus for preventing and minimizing deposition by said fluid upon said conduit's interior walls, said apparatus comprising:

an elongated tubular housing configured to be interconnected to and axially aligned with said conduit, and having at one end thereof inlet means for receiving said flowing fluid from said upstream portion of said conduit and having at its other opposite end an outlet means for returning said flowing fluid to said downstream portion of said conduit, said housing having a longitudinal axis;

an elongated annular chamber encased within said elongated housing and disposed axially thereof;

sealing means disposed adjacent said housing, for sealing said annular chamber;

magnetic core means fixedly attached to said housing for generating a magnetic flux field perpendicular to said flowing fluid, said magnetic core means having:

sleeve means disposed concentrically of said longitudinal axis within said annular chamber, said sleeve means including an inner tubular passageway and an outer surface, said tubular passage including an upstream end and a downstream end said sleeve means including a plurality of pairs of opposed recesses formed in said outer surface, each pair of recesses being centrally aligned along a respective transverse axis that is perpendicular to said longitudinal axis, wherein said transverse axes are axially spaced apart from one another along said longitudinal axis, and wherein each said transverse axis located closest said upstream end is rotationally displaced about said longitudinal axis relative to an adjacent transverse axis located closest said downstream end in a single direction of rotation about said longitudinal axis, whereby said recesses are located axially of the housing and placed in an angulated configuration manifesting a spiral from left to right about said longitudinal axis;

said sealing means including means for fluidly connecting the upstream end of said sleeve to said inlet means, and means for fluidly connecting the downstream end of said sleeve to said outlet means;

wherein said tubular passageway disposed concentrically of said sleeve means and further disposed medially of said inlet means and said outlet means, for receiving said fluid;

a plurality of permanent magnets, wherein one said permanent magnet is disposed within each said recess;

wherein the magnets located within a respective said pair of opposed recesses are disposed so that the North pole of a first permanent magnet and the South pole of a second permanent magnet face towards one another to produce a respective magnetic flux field that extends perpendicularly to said longitudinal axis and through said inner tubular passageway;

a plurality of magnetic shells, wherein one said magnetic shell surrounds a respective said pair of opposed recesses and permanent magnets therein and surrounds said sleeve means and is disposed within said annular chamber means to contain a respective said magnetic flux field, wherein said magnetic shells are axially spaced apart from one another;

each said magnetic shell being fixedly attached to said pair of permanent magnets by magnetic fastener means for completely containing a respective said magnetic flux field; and each of said pair of permanent magnets disposed so that said magnetic flux field is disposed in a North to South direction relative to said flowing fluid and disposed so that said magnetic flux field is disposed in a South to North direction relative to said shell means, and successively rotated relative to said longitudinal axis of said housing whereby said magnetic flux field generated by said plurality of permanent magnet assemblies deflects said colloidally suspended charged particles into a helicoidal trajectory as said charged particles traverse said magnetic flux field simultaneously with said fluid flowing through said passageway, to maximize said charged particles—exposure to said magnetic flux field.

2. The apparatus recited in claim 1, wherein said means for fluidly connecting the upstream end of said sleeve to said inlet comprises contiguous means for increasing velocity of said fluid therethrough.

3. The apparatus recited in claim 2, wherein said contiguous means for increasing velocity comprises first conical means.

4. The apparatus recited in claim 1, wherein said means for fluidly connecting the downstream end of said sleeve to said outlet comprises contiguous means for decreasing velocity of said fluid therethrough.

5. The apparatus recited in claim 4, wherein said contiguous means for decreasing velocity comprises second conical means.

6. The apparatus recited in claim 5, wherein said first conical means and said second conical means are configured similarly.

7. The apparatus recited in claim 1, wherein said elongated housing comprises a non-magnetic material.

8. The apparatus recited in claim 1, wherein said elongated housing has a cylindrical shape.

9. The apparatus recited in claim 1, wherein said passageway has a cylindrical shape.

10. The apparatus recited in claim 1, wherein each of said permanent magnets has a cylindrical disc shape.

11. The apparatus recited in claim 1, wherein said annular chamber means is filled with an incompressible fluid.

12. The apparatus recited in claim 1, wherein said permanent magnets comprises a rare earth magnetic material.

13. The apparatus recited in claim 1, wherein said permanent magnets comprises a material selected from the group consisting of ferrites, aluminum-nickel-cobalt alloys and neodymium-iron-boron.

14. The apparatus recited in claim 1, wherein said sleeve comprises non-magnetic material selected from the group consisting of stainless steel alloy and aluminum.

15. The apparatus recited in claim 1, wherein said magnetic core means is fixedly attached to said housing by flange and shoulder means.

16. The apparatus recited in claim 1, wherein said fastener means includes a threaded aperture extending radially through a said shell adjacent a respective said magnet, and a threaded screw formed of a magnetic material threadedly engaging a respective said aperture and engaging a radially outer surface of said magnet.

* * * * *